United States Patent Office 3,745,133
Patented July 10, 1973

3,745,133
CELLULAR ISOCYANURATE CONTAINING POLYMERS
Giuseppe V. Comunale, Wakefield, Mass., and Herbert G. Nadeau, North Haven, Conn., assignors to The Upjohn Company, Kalamazoo, Mich.
No Drawing. Filed Feb. 5, 1968, Ser. No. 702,785
Int. Cl. C08g 22/44
U.S. Cl. 260—2.5 AW         11 Claims

ABSTRACT OF THE DISCLOSURE

High temperature resistant, low flame spread cellular polymers are disclosed. These polymers are obtained by polymerizing polymethylene polyphenyl isocyanates containing 35 to 85 percent by weight of methylenebis(phenyl isocyanate) in the presence of a tertiary amine and a monomeric homocyclic polyepoxide and/or a polyol. The amount of tertiary amine employed is from about 0.01 equivalent to about 0.25 equivalent per equivalent of polyisocyanate. The amount of monomeric homocyclic polyepoxide is from about 0.0045 equivalent to about 0.5 equivalent per equivalent of polyisocyanate. The amount of polyol is from about 0.01 equivalent to about 0.3 equivalent per equivalent of polyisocyanate. The novel foams are useful in thermal insulation and like applications where resistance to extreme temperatures and low flame spread requirements must be met.

BACKGROUND OF THE INVENTION

(1) Field of the invention

This invention relates to a novel process for the preparation of low density high temperature resistant foams and is more particularly concerned with a process for the preparation of cellular polymers by polymerizing polymethylene polyphenyl isocyanates and with the cellular polymers so prepared.

(2) Description of the prior art

Innumerable methods of polymerizing organic polyisocyanates to give both cellular and non-cellular products have been described previously. However, the polyisocyanate based-cellular polymers prepared by the procedures so far described in the art are generally those in which the main reaction is that of polyurethane formation. The polymerization of the polyisocyanate is taking place either concurrently with polyurethane formation or is taking place as a subsequent step after polyurethane formation has occurred e.g. after the formation of an isocyanate-terminated urethane. Because of the polyurethane linkages present therein such products are not sufficiently stable thermally, and do not possess sufficiently low flame spread ratings, to meet the present requirements of the aerospace and construction industries. Additionally, the cellular polyisocyanate polymers so far produced in the art have had densities so high that they could not be produced economically on a commercial scale. Polymers exhibiting high temperature resistance and low flame spread properties are currently in great demand particularly in the aerospace and institutional building industry wherein the cellular polymers are generally employed as structural insulation and as thermal barriers.

Typical of the procedures by which a combined polyurethane-polymerized polyisocyanate cellular product is prepared are those described in U.S. Pats. 3,168,483 and 3,294,753. The disclosure in both patents is substantially the same and shows the use of a mixture of diazabicyclooctane(triethylene diamine) and a $C_2$ to $C_4$ alkylene oxide in the catalysis of a reaction between a polyol and a polyisocyanate to produce cellular products, the polyisocyanate being employed in an amount in excess of the stoichiometric proportion required for polyurethane formation. Said patents also show the polymerization of certain polyisocyanates using the above aminealkylene oxide mixture in the absence of any polyol to produce a non-cellular resin. There is no suggestion, however, that the latter procedure could be adapted to the preparation of polymer foams free from polyurethane linkages.

U.S. Pats. 2,979,485, 3,206,352, and 3,211,703 show the polymerization of mono- and diisocyanates in the presence of an epoxide and a basic compound to give a non-cellular resinous product. There is no suggestion therein of how to prepare cellular products from such systems.

It is also known that polymer foams can be prepared by the reaction of polyisocyanates and epoxides in approximately stoichiometric proportions under foam producing conditions; see, for example, U.S. Pats. 3,198,851 and 3,242,108. Such procedures involve the actual interaction of the polyisocyanate and the epoxide and are clearly distinguished from procedures in which the epoxide is used as catalyst to initiate polymerization of the polyisocyanate.

Nicholas and Gmitter, Journal of Cellular Plastics, pages 85–90, January 1965, describe the preparation of polymer foams from isocyanate-terminated prepolymers (derived from toluene diisocyanate) and employing as catalyst a trialkylamino-hexahydrotriazine or a trialkylaminoalkylphenol alone or in combination with a polyepoxy resin. The disclosure of French Pat. 1,441,565 extends this procedure to the preparation of one-shot as well as prepolymer-based foams and teaches the preparation of such foams from a wide variety of polyisocyanates. In a preferred embodiment a polyol is included in the foam producing mixture. The foams produced in accordance with these references are characterized by relatively high densities and have only limited resistance to exposure to high temperatures. In addition, said foams are found to have flame spread ratings (as measured by the ASTM E 84–61 test) which are not sufficiently low to permit their use for construction purposes such as housing, office buildings and the like which are governed by local building codes.

We have now found that it is possible to prepare low density cellular polyisocyanate polymers having higher resistance to thermal degradation and remarkably low flame spread ratings than was heretofore obtainable in foams of this type. Thus, we have found that by employing certain isocyanates, namely polymethylene polyphenyl polyisocyanates containing 35 to 85 percent by weight of methylenebis(phenyl isocyanate) it is possible to produce foams which have unexpected superior properties to those possessed by foams prepared from the broad range of polyisocyanates disclosed in the art. Such a finding is clearly novel and unexpected being neither taught nor suggested by the prior art. Such a finding is also clearly valuable and represents a significant step forward in the art. Further the process of the invention can be readily adapted for use with high speed mixing machinery commonly employed in the art for mixing and dispensing polymer foam reaction mixtures and the like. These findings greatly extend the range of applications for which these materials can be adapted.

SUMMARY OF THE INVENTION

The process of the invention, in its broadest aspect, comprises a process for the preparation of high temperature resistant and low flame spread cellular polymers which comprises bringing together, under foam producing conditions:

(a) a polyisocyanate containing from about 35 to about 85 percent by weight methylenebis(phenyl isocyanate);
(b) from about 0.01 to about 0.25 equivalent, per equivalent of said polyisocyanate, of a tertiary amine;
(c) from about 0 to about 0.5 equivalent, per equivalent of polyisocyanate, of a monomeric homocyclic polyepoxide;
(d) from about 0 to about 0.3 equivalent, per equivalent of said polyisocyanate, of a polyol having an average functionality of from 2 to 8 and an average hydroxyl equivalent weight of from about 30 to about 1500, provided that when no polyol (d) is present the monomeric homocyclic polyepoxide (c) is present in an amount of from about 0.0045 to about 0.5 equivalent per equivalent of polyisocyanate and further provided that when no monomeric homocyclic polyepoxide (c) is present the polyol (d) is present in an amount of from about 0.01 to about 0.3 equivalent per equivalent of polyisocyanate.

The invention also includes the cellular polymers obtained by the above process and by the various embodiments thereof which are set forth herein.

DETAILED DESCRIPTION OF THE INVENTION

In carrying the process of the invention, the procedure adopted is substantially that described in the art; see, for example French Pat. 1,441,565, the principal, but highly significant, difference being the use of a particular polyisocyanate namely, a polyisocyanate containing from about 35 to about 85 percent by weight of methylenebis (phenyl isocyanate). Thus, the various components of the foam reaction mixture, namely the polyisocyanate, the tertiary amine, the polyepoxide and/or the polyol, the blowing agent as hereinafter defined, and any other adjuvants which may be employed as discussed hereinafter, are brought together in the appropriate proportions using agitation means sufficient to ensure homogeneity in the resultant mixture. The mixing of the components in this way can be carried out by hand, when operating on a small scale, but is advantageously carried out using the various mixing and dispensing machines conventionally employed in the manufacture of polymer foams; see, for example, Ferrigno, "Rigid Plastic Foams," Reinhold Publishing Corporation, New York, 1963.

As set forth above, the principal components of the foam reaction mixture are polyisocyanate (I) as hereinafter defined, the blowing agent, the tertiary amine (III) as hereinafter defined and, in addition to these essential components, either a monomeric homocyclic polyepoxide (II) as hereinafter defined, or a polyol (IV) as hereinafter defined or a combination of said monomeric homocyclic polyepoxide (II) and said polyol (IV). When the monomeric homocyclic polyepoxide (II) is employed in the absence of a polyol (IV), said polyepoxide (II) must be present in at least the minimum amount, i.e. 0.0045 equivalent per equivalent of polyisocyanate (I) set forth above. Similarly when the polyol (IV) is employed in the absence of any said polyepoxide (II), the polyol (IV) must be present in at least the minimum amount i.e. 0.01 equivalent per equivalent of polyisocyanate (I), set forth above. When both the polyol (IV) and the polyepoxide (II) are employed together, the combined amount of these two components must be no more than 0.6 equivalent per equivalent of polyisocyanate (I).

The polyisocyanate component (I) which is the starting material employed in carrying out the process of the invention is a polyisocyanate containing from about 35 to about 85 percent by weight of methylenebis(phenyl isocyanate) the remainder of said polyisocyanate being comprised of closely related polyisocyanates of higher molecular weight and functionality.

Thus the polyisocyanate (I) is inclusive of (a) polymethylene polyphenyl polyisocyanates which have a content of methylenebis(phenyl isocyanate) in the above range and which are derived by phosgenation of mixtures of polyamines obtained by acid condensation of aniline and formaldehyde; and (b) polyisocyanates having a content of methylenebis(phenyl isocyanate) in the above range obtained by chemical modification of methylenebis (phenyl isocyanate) itself and which are referred to herein as "modified" methylenebis(phenyl isocyanates).

The modified methylenebis(phenyl isocyanates) are inclusive of methylenebis(phenyl isocyanate), either 4,4'-isomer or mixtures of 4,4'-isomer and 2,4'-isomer, which has been treated to convert a minor proportion, generally less than 25 percent by weight of the starting material, to an artefact of said starting material. For example, the organic polyisocyanate can be methylenebis(phenyl isocyanate) which has been converted to a stable liquid at temperatures of about 150° C. [methylenebis(phenyl isocyanate) is normally a solid at ambient temperature and has a melting point of the order of 35 to 42° C.] by heating at about 160° C. to about 250° C. in the presence of from about 0.1 to about 3 percent of a trialkyl phosphate such as triethyl phosphate. Said heating process can be carried out on a batch or continuous basis and the period for which the heating is carried out varies according to the reaction temperature employed. The conditions of heating time and reaction temperature required to convert any particular batch of methylenebis(phenyl isocyanate) to a stable liquid product can be readily determined empirically. Generally speaking, such treatments are carried out under such conditions that the isocyanate equivalent has changed from an initial value of 125, corresponding to the methylenebis(phenyl isocyanate) originally present as starting material, to a value in the range of 130 to 175. The processes employed in the preparation of the above materials are advantageously those described in Belgium Pat. 678,773

Illustrative of other modified methylenebis(phenyl isocyanates) are the products obtained by treating methylenebis(phenyl isocyanate) [either pure 4,4'-isomer or mixtures of the latter with the 2,4'-isomer] with a minor portion of a carbodiimide in accordance, for example, with the procedure described in British Pat. 918,454. A minor proportion of methylenebis(phenyl isocyanate) is thereby converted to the corresponding isocyanato-substituted carbodiimide and there is obtained a mixture of a major proportion of unchanged starting material and a minor proportion of said isocyanato-substituted carbodiimide.

The polymethylene polyphenyl polyisocyanates (a) which can be employed as the polyisocyanate component (I) in the process of the invention are those which are well-recognized in the art and are obtained by phosgenation of mixtures of the corresponding methylene-bridged polyphenyl polyamines. The latter, in turn, are obtained by interaction of formaldehyde, hydrochloric acid and primary aromatic amines, such as aniline, o-chloroaniline, o-toluidine, and the like using procedures well-known in the art; see for example, U.S. Pats. 2,683,730, 2,950,263, and 3,012,008; Canadian Patent 700,026; and German specification 1,131,877.

Said polymethylene polyphenyl isocyanates generally contain from about 35 to about 85 percent by weight of methylenebis(phenyl isocyanates) the remainder of said mixture being polymethylene polyphenyl isocyanates of functionality higher than 2.0. The overall average functionality of any particular mixture is, of course, directly related to the proportions of the various polymethylene polyphenyl isocyanates in the mixture. The latter proportions correspond substantially to the proportions of methylene-bridged polyphenyl polyamines in the intermediate mixture of polyamines which is phosgenated to obtain the isocyanate. The desired proportion of methylene-bridged polyphenyl polyamines in said mixture is generally controlled by varying the ratio of aniline, or other aromatic amines, to formaldehyde in the initial condensation. For example, using a ratio of approximately 4 moles of aniline to 1.0 mole of formaldehyde, there is obtained a mixture of polyamines containing approximately 85 percent by weight of methylenedianilines. Using a ratio of approximately 4 moles of aniline to about 2.6 moles of formaldehyde there is obtained a mixture of polyamines containing approximately 35 percent by weight of methylenedianilines. Mixtures of polyamines containing proportions of methylenedianiline intermediate between these limits can be obtained by appropriate adjustment of the ratio of aniline to formaldehyde.

Particularly preferred as the polyisocyanate component (I) in the preparation of the high temperature resistant polymers of the invention are those polymethylene polyphenyl isocyanates which have been heat treated to render the viscosity more suitable for machine handling of the product. Such treatments are carried out at temperatures from about 150° C. to about 300° C. under such conditions that the viscosity (at 25° C.) is increased to about 800 to 1500 centipoises. The most preferred organic polyisocyanate (I) employed in the preparation of the high temperature resistant polymers of the invention is the polymethylene polyphenyl polyisocyanate containing about 50 percent by weight of methylenebis(phenyl isocyanates) which has been treated in the above manner so that the final viscosity (at 25° C.) has been increased to about 1000 centipoises.

The polyepoxide (II), which is used as a component of the foam generating mixture in carrying out the process of the invention, can be any monomeric homocyclic polyepoxide. Such epoxides are characterized by the presence of at least two epoxy groups each of which is present in a substituent attached to a cyclic hydrocarbon compound or is fused to a non-aromatic ring in a cyclic hydrocarbon compound. Examples of monomeric homocyclic polyepoxides are:

(1) The glycidyl ethers of polyhydric mononuclear and fused ring phenols such as resorcinol, hydroquinone, pyrocatechol, saligenin, phloroglucinol, 1,5-dihydroxynaphthalene, 1,6-dihydroxynaphthalene, 1,7-dihydroxynaphthalene and the like;

(2) The glycidyl ethers of non-fused polynuclear phenols represented by the general formula:

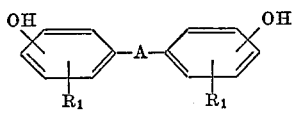

(a)

wherein $R_1$ represents from 0 to 4 substituents selected from the class consisting of halogen and lower-alkyl, A is a bridging group selected from the class consisting of

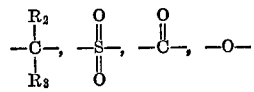

and a single covalent bond, wherein $R_2$ and $R_3$ each represent a moiety selected from the class consisting of hydren, lower-alkyl, lower-cycloalkyl and aryl. Illustrative of such compounds are the bis(glycidyl ethers) of:

4,4'-dihydroxydiphenylsulfone,
4,4'-dihydroxybiphenyl,
4,4'-dihydroxybenzophenone,
di(4-hydroxyphenyl)methane (bisphenol F),
2,2-di(4-hydroxyphenyl)butane (bisphenol B),
2,2-di(4-hydroxyphenyl)propane (bisphenol A),
1,1-di(4-hydroxyphenyl)propane,
3,3-di(3-hydroxyphenyl)pentane,
2-(3-hydroxyphenyl)-2-(4'-hydroxyphenyl)butane,
1-phenyl-1-(2-hydroxyphenyl)-1-(3'-hydroxyphenyl)propane,
1-phenyl-1,1-di(4-hydroxyphenyl)butane,
1-phenyl-1,1-di(4-hydroxyphenyl)pentane,
1-tolyl-1,1-di(4-hydroxyphenyl)ethane,
bis(3-bromo-4-hydroxyphenyl)methane,
2,2-bis(3-bromo-4-hydroxyphenyl)propane,
bis(3-bromo-4-hydroxyphenyl)diphenylmethane,
1,1-bis(3-bromo-4-hydroxyphenyl)-1-(2,5-dibromophenyl)ethane,
2,2-bis(3-bromo-4-hydroxyphenyl)propionitrile,
bis(3,5-dibromo-4-hydroxyphenyl)methane,
2,2-bis(3,5-dibromo-4-hydroxyphenyl)diphenylmethane,
bis(3,5-dibromo-4-hydroxyphenyl)diphenylmethane,
1,1-bis(3,5-dibromo-4-hydroxyphenyl)-1-(2,5-dibromophenyl)ethane,
bis(3-bromo-4-hydroxyphenyl)sulfone,
bis(3,5-dibromo-4-hydroxyphenyl)sulfone;

(3) The glycidyl ethers of novolac resins. The novolac resins are the products obtained by acid condensation of phenol, or a substituted phenol, with formaldehyde and are conventionally represented by the general formula:

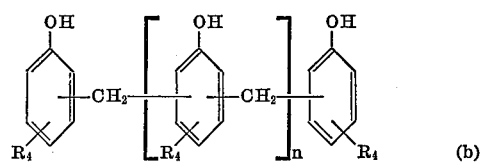

(b)

wherein $n$ has an average value of from about 8 to 12 and $R_4$ represents from 0 to 4 substituents selected from halogen and lower alkyl groups. It is to be understood that the above formula is highly idealized and is an approximation only; see, for example, Carswell, "Phenoplasts," pages 29–35, Interscience, New York, 1947. A wide range of novolac resins of differing molecular weights is available commercially, all of which are represented approximately by the above formula. Since the class of novolac resins is so well recognized in the art, the epoxides derived therefrom by conversion of the novolacs to their glycidyl ethers (by conventional procedures e.g. reaction with epichlorohydrin) will be referred to hereafter as "novolac resin glycidyl ethers";

(4) Dicyclopentadiene dioxide i.e. the compound having the formula:

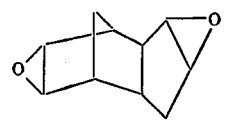

(c)

(5) Vinyl cyclohexene dioxide, i.e. the compound having the formula:

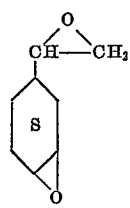

(d)

(6) The dicyclohexyl oxide carboxylates represented by the general formula:

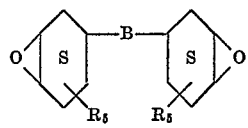

(e)

wherein $R_5$ in each instance represents from 0 to 9 lower-alkyl groups, and B represents a divalent radical selected from the class consisting of:

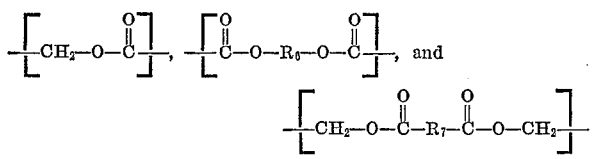

wherein $R_6$ is selected from the class consisting of lower-alkylene and lower-oxyalkylene and $R_7$ is selected from the class consisting of lower-alkylene and arylene. Examples of the dicyclohexyl oxide carboxylates are:

3,4-epoxycyclohexylmethyl 3,4-epoxycyclohexane-carboxylate,
3,4-epoxy-6-methylcyclohexylmethyl 3,4-epoxy-6-methyl cyclohexylcarboxylate,
bis(3,4-epoxycyclohexylmethyl)maleate,
bis(3,4-epoxycyclohexylmethyl)succinate,
ethylene glycol bis(3,4-epoxycyclohexanecarboxylate),
2-ethyl-1,3-hexanediol bis(3,4-epoxy-6-methylcyclo-hexanecarboxylate) and the like.

The term "lower alkyl" is used throughout this specification and claims as meaning alkyl containing from 1 to 6 carbon atoms such as methyl, ethyl, propyl, butyl, pentyl, hexyl and isomeric forms thereof. The term "halogen" means fluorine, chlorine, bromine, and iodine. The term "lower-alkylene" means alkylene containing from 1 to 6 carbon atoms such as methylene, ethylene, 1,3-propylene, 1,4-butylene, 2,3-butylene, 1,6-hexylene and the like. The term "lower-cycloalkyl" means cycloalkyl from 4 to 8 carbon atoms such as cyclobutyl, cyclopentyl, cyclohexyl, cycloheptyl and cyclooctyl. The term "lower-oxyalkylene" means lower alkylene, as defined above, interrupted by the radical —O—. The term "arylene" means a bivalent radical, such as phenylene, tolylene, xylylene, biphenylylene and the like, derived from an aromatic hydrocarbon by removal of a hydrogen atom from each of two carbon atoms of the nucleus. The term "aryl" means the moiety obtained by removing one hydrogen atom from an aromatic hydrocarbon of from 6 to 12 carbon atoms, inclusive. Illustrative of aryl moieties are phenyl, tolyl, xylyl, biphenylyl, naphthyl and the like.

The monomeric homocyclic polyepoxides described and exemplified hereinabove are, for the most part, well known in the art and can be prepared by methods well known in the art; see, for example, Lee and Neville, "Epoxy Resins," McGraw-Hill Book Company, New York (1957), U.S. Pats. 2,633,458, 2,716,123, 2,745,847, 2,745,285, 2,872,427, 2,902,518, 2,884,408, 3,268,619, 3,325,452, and British Pat. 614,235.

While any of the monomeric homocyclic polyepoxide compounds exemplified hereinabove can be used in the preparation of the high temperature resistant polymers of the invention, the preferred compounds for this purpose are those of the groups (1) and (2) set forth above, namely, the glycidyl ethers of polyhydric mononuclear and fused ring phenols and the glycidyl ethers of non-fused polynuclear phenols represented by the Formula (a) above. The use of epoxides of these two classes gives rise to cellular polymers of the invention which possess the highest resistance to deformation by heat and the lowest flame spread rating of the cellular polymers of this class. Within this particular group of polyepoxides we have found that those which are derived from the phenols of Formula (a) above wherein each of $R_1$ represents halogen are the most preferred since they give rise to cellular polymers having the highest resistance to flame spread and heat deformation.

The tertiary amines (III) which are employed in accordance with the process of the invention are those which are more usually employed to catalyze the reaction between an isocyanato group and an active hydrogen atom. Such catalysts are a group of compounds well-recognized in the art of synthesising polyurethanes; see, for example, Saunders et al., Polyurethanes, Chemistry and Technology, Part I, pages 228–230, Interscience Publishers, New York, 1964, see also Burkus, J., Journal of Organic Chemistry, 26, pages 779–782, 1961.

Representative of said tertiary amine catalysts are: N,N-dialkylpiperazines such as N,N-dimethylpiperazine, N,N-diethylpiperazine and the like; trialkylamines such as trimethylamine, triethylamine, tributylamine and the like; 1,4-diazabicyclo [2·2·2] octane, which is more frequently referred to as triethylene diamine, and the lower-alkyl derivatives thereof such as 2-methyl triethylene diamine, 2,3-dimethyl triethylene diamine, 2,5-diethyl triethylene diamine and 2,6-diisopropyl triethylene diamine; N,N',N" - trialkylaminoalkylhexahydrotriazines such as N,N',N"-tris(dimethylaminomethyl)hexahydrotriazine,
N,N',N"-tris(dimethylaminoethyl)hexahydrotriazine,
N,N',N"-tris(dimethylaminopropyl)hexahydrotriazine,
N,N',N"-tris(diethylaminoethyl)hexahydrotriazine,
N',N',N"-tris(diethylaminopropyl)hexahydrotriazine
and the like;

mono-, di-, and tri-(dialkylaminoalkyl) monohydric phenols or thiophenols such as 2-(dimethylaminomethyl)phenol,
2-(dimethylaminobutyl)phenol,
2-(diethylaminoethyl)phenol,
2-(diethylaminobutyl)phenol,
2-dimethylaminomethyl)thiophenol,
2-(diethylaminoethyl)thiophenol,
2,4-bis(dimethylaminoethyl)phenol,
2,4-bis(diethylaminobutyl)phenol,
2,4-bis(dipropylaminoethyl)phenol,
2,4-bis(dimethylaminoethyl)thiophenol,
2,4-bis(diethylaminopropyl)thiophenol,
2,4-bis(dipropylaminoethyl)thiophenol,
2,4,6-tris(dimethylaminoethyl)phenol,
2,4,6-tris(diethylaminoethyl)phenol,
2,4,6-tris(dimethylaminobutyl)phenol,
2,4,6-tris(dipropylaminomethyl)phenol,
2,4,6-tris(diethylaminoethyl)thiophenol,
2,4,6-tris(dimethylaminoethyl)thiophenol and the like;

N,N,N',N'-tetraalkylalkylenediamines such as

N,N,N',N'-tetramethyl-1,3-propanediamine,
N,N,N',N'-tetramethyl-1,3-butanediamine,
N,N,N',N'-tetramethylethylenediamine,
N,N,N',N'-tetraethylethylenediamine and the like;

N,N-dialkylcyclohexylamines such as N,N-dimethylcyclohexylamine, N,N-diethylcyclohexylamine and the like; N-alkylmorpholines such as N-methylmorpholine, N-ethylmorpholine and the like; N,N-dialkylalkanolamines such as N,N-dimethylethanolamine, N,N-diethylethanolamine and the like; N,N,N',N'-tetraalkylguanidines such as N,N,N',N' - tetramethylguanidine, N,N,N',N'-tetraethylguanidine and the like. The preferred tertiary amine catalysts for use in the process of the invention are the triethylene diamines, the N,N',N"-tris(alkylaminoalkyl)hexahydrotriazines, the mono(dialkylaminoalkyl)phenols, and the 2,4,6-tris(alkylaminoalkyl)phenols. In a particular aspect of the invention, the most preferred tertiary amine catalyst comprises a mixture of a N,N',N"-tris(alkylaminoalkyl)hexahydrotriazine and a mono(dialkylaminoalkyl) phenol.

The amount of tertiary amine (III) which is employed in the foam reaction mixture in preparing the cellular polymers of the invention can vary over a reasonably wide range depending upon whether a monomeric homocyclic polyepoxide (II) is used. That is, when a monomeric homocyclic polyepoxide (II) is used in conjunction with the tertiary amine (III) it has been found advantageous to employ the tertiary amine in an amount corresponding to from about 0.02 to about 0.09 equivalent per equivalent of polyisocyanate (I) and preferably from about 0.02 to about 0.05 equivalent per equivalent of polyisocyanate (I). When a monomeric homocyclic polyepoxide is not used in conjunction with the tertiary amine (III), the amount of tertiary amine (III) employed in the preparation of the novel high temperature resistant polymers of the invention is advantageously from about 0.01 to about 0.25 equivalent per equivalent of polyisocyanate (I) and preferably from about 0.05 equivalent to about 0.15 equivalent per equivalent of polyisocyanate (I). By "equivalent" of tertiary amine is meant the chemical equivalent, i.e. the molecular weight of the tertiary amine divided by the number of tertiary amino groups present in the molecule. The equivalent weight is expressed in whatever units of weight, i.e. grams, pounds, tons, are employed to designate the other components of the reaction mixture.

The polyepoxide (II), if used as a component in the preparation of the novel high temperature cellular polymers of the invention, is employed and is advantageously present in an amount within the range of about 0.0045 equivalent to about 0.5 equivalent per equivalent of polyisocyanate (I). Preferably, the polyepoxide (II) is employed in the reaction mixture in an amount within the range of about 0.08 equivalent to about 0.2 equivalent per equivalent of polyisocyanate (I). The term "equivalent" used in respect to the polyepoxide (II) means the molecular weight of the latter divided by the number of epoxy groups present in the molecule. The equivalent weight is expressed in whatever units, i.e. grams, pounds, tons, etc., are used to designate the amounts of the other components of the reaction mixture.

The polyols (IV) which are employed in the preparation of the novel polymers of the invention advantageously are those having average hydroxyl equivalent weights (i.e. the polyol molecular weight divided by the number of hydroxyl groups) of from about 30 to about 1,500 and having from about 2 to about 8 hydroxyl groups per molecule. Preferably, said polyols (IV) have average hydroxyl equivalent weights of from about 90 to about 500 and have from about 3 to about 6 hydroxyl groups per molecule.

The amount of polyol (IV) incorporated into the polymer reaction mix, if used, is advantageously at least 0.01 equivalent to about 0.3 equivalent per equivalent of polyisocyanate (I). Preferably, the polyol (IV) is employed in an amount of from about 0.09 to about 0.2 equivalent per equivalent of polyisocyanate (I). The polyol (IV) may be added to the reaction mix as a separate component or as a preformed mixture with one or more of the other components of the reaction mix.

Illustrative of polyols (IV) falling within the above limits of equivalent weight and functionality which can be used in preparing the high temperature foams in accordance with the process of the invention are:

(1) Polyethers, for example, polyoxyalkylene glycols such as the polyoxyethylene glycols prepared by the addition of ethylene oxide to water, ethylene glycol or diethylene glycol, polyoxypropylene glycols prepared by the addition of 1,2-propylene oxide to water, propylene glycol or dipropylene glycol, mixed oxyethyleneoxypropylene polyglycols prepared in a similar manner utilizing a mixture of ethylene oxide and 1,2-propylene oxide; polyether glycols prepared by reacting ethylene oxide, propylene oxide or mixtures thereof with mono- and polynuclear polyhydric phenols, e.g. catechol, resorcinol, hydroquinone, orcinol, 2,2-bis(hydroxyphenyl)propane, bis (p-hydroxyphenyl)methane, and the like; polyethers prepared by reacting ethylene oxide, propylene oxide or mixtures thereof with aliphatic polyols such as glycerol, trimethylolpropane, 1,2,6-hexanetriol, pentaerythritol, sorbitol, sucrose or the alkyl glycosides, e.g. the methyl, ethyl, propyl, butyl, and 2-ethylhexyl arabinosides, xylosides, fructosides, glucosides, rhamnosides, etc.; polyethers prepared by reacting ethylene oxide, propylene oxide or mixtures thereof with alicyclic polyols such as tetramethylolcyclohexanol; polyols containing a heterocyclic nucleus such as 3,3,5-tris(hydroxymethyl)-5-methyl-4-hydroxytetrahydropyran, and 3,3,5,5-tetrakis(hydroxymethyl)-4-hydroxytetrahydropyran, or polyols containing an aromatic nucleus such as 2,2-bis(hydroxyphenyl) ethanol, pyrogallol, phloroglucinol, tris(hydroxyphenyl) alkanes, e.g. 1,1,3-tris(hydroxyphenyl)ethanes, and 1,1, 3-tris(hydroxyphenyl)propanes, etc., tetrakis(hydroxyphenyl)alkanes, e.g. 1,1,3,3-tetrakis(hydroxy-3-methylphenyl)propanes, 1,1,4,4 - tetrakis(hydroxyphenyl)butanes, and the like;

(2) Polyol mixtures comprising a polyol adduct produced by mixing under hydroxyalkylation conditions from 2 to 20 molecular equivalents of ethylene oxide, propylene oxide, or 1,2-butylene oxide, or mixtures thereof, and one amine equivalent of a polyamine mixture, 100 parts of said polyamine mixture containing from 30 to 90 parts of methylenedianilines, the remaning parts being triamines and polyamines of higher molecular weight, said polyamine mixture having been formed by acid condensation of aniline and formaldehyde;

(3) Polyols obtained by the Mannich condensation of a phenolic compound with formaldehyde and an alkanolamine, and the alkylene oxide adducts thereof; see, for example, U.S. 3,297,597;

(4) Hydroxyalkylated aliphatic diamines such as N,N, N',N'-tetrakis(2-hydroxypropyl)ethylenediamine;

(5) Hydroxyalkylated isocyanuric acid such as tris(2-hydroxyethyl)isocyanurate, and the like;

(6) Polyester polyols prepared from dibasic carboxylic acids and polyhydric alcohols. The dibasic carboxylic acids useful in preparing the polyesters have no functional groups containing active hydrogen atoms other than their carboxylic acid groups. They are preferably saturated. Acids such as phthalic acid, terephthalic acid, isophthalic acid, succinic acid, glutaric acid, adipic acid, and pimelic acid are suitable. Anhydrides of these acids can be used also. The polyol component or components of the polyester are preferably trihydric alcohols such as trimethylolethane, trimethylolpropane, mannitol, 1,2, 6-hexanetriol, glycerol, and pentaerythritol. Mixtures of two or more such polyols can be used. In addition a mixture of one or more of said trihydric alcohols with a minor amount of a dihydric alcohol such as ethylene glycol, diethylene glycol, 1,2-propylene glycol, 1,4-butanediol, cyclohexanediol, and the like, can also be used in esterification of the dibasic carboxylic acid.

Particularly useful polyols for employment in the process of the invention are those polyols containing phosphorus and/or chlorine and bromine such as: the polyester polyols based on chlorendic acid, tetrabromo phthalic acid and tetrachloro phthalic acid or the corresponding anhydrides thereof; see, for example, U.S. Pats. 2,865,869, 3,018,256, 3,058,925, 3,098,047, and 3,214,392. Generally, said polyester polyols are solid and require blending with a lower viscosity polyol before mixing with the various other components of the high temperature resistant cellular reaction mixture. Any of the above polyethers having viscosities, at 25° C., below about 20,000 centipoises can be used as diluents for the aforesaid halogenated polyester polyols provided that the overall hydroxyl functionality and equivalent weight of the resulting mixtures fall within the limits set forth above.

Illustrative of polyether polyols which can be used as diluents for the above halogenated polyester polyols are the polyoxyalkylene glycols such as diethylene glycol, dipropylene glycol and the like, the alkoxylated aliphatic polyols such as glycerol, sorbitol, trimethylolpropane, pentaerythritol, 1,2,6-hexanetriol, and the like. Generally speaking, however, the preferred polyether polyols are the polyoxyalkylene glycols employed in an amount corresponding to from about 20 to about 50 percent by weight of the polyol mixture. The preferred polyester polyols are those comprising the product of reaction of chlorendic acid or the anhydride thereof and a polyhydric alcohol such as glycerol, trimethylolethane, trimethylolpropane and 1,2,6-hexanetriol.

When a polyol (IV), as defined hereinabove, is employed as a component of the foam producing mixture, said polyol (IV) can be added as a separate component to the reaction mixture, or it can be blended with any one or more of the other components, or it can be pre-reacted in part or in toto with the polyisocyanate (I) to form an isocyanate-terminated prepolymer which is subsequently added to the other components of the reaction mixture.

The density of cellular polymers, as is well-known in the art, is regulated by incorporating appropriate amounts of extraneous foaming agents. Illustrative of said foaming agents are water (which generates carbon dioxide by reaction with isocyanate) and volatile solvents such as the lower molecular weight halogenated aliphatic hydrocarbons, namely those having boiling points of from about −40° to about 200° C., preferably from about −20° to about 110° C., for example, difluoromonochloromethane, trichloromonofluoromethane, dichlorodifluoromethane, chlorotrifluoromethane, 1,1-dichloro-1-fluoroethane, 1-chloro-1,1-difluoro-2,2-dichloroethane, and 1,1,1-tribromo-2-chloro-2-fluorobutane, and the like.

Generally speaking, the amount of foaming agent employed depends upon the desired density. Thus if low density foams, i.e. 2 to 10 pounds per cubic foot, are desired, the amount of halogenated aliphatic hydrocarbon is from about 5 to about 20 percent by weight based on the total formulation weight. When water is employed as a foaming agent, the amount required to produce foams of density within the above range is from about 0.2 part to about 3 parts by weight based on the total formulation weight. If desired, a mixture of water and one or more of said volatile solvents can be used as a foaming agent.

Other optional additives such as dispersing agents, cell stabilizers, surfactants, flame retardants, and the like which are commonly employed in the fabrication of polymer foams, can be employed in the process of the invention. Thus a finer cell structure may be obtained if water-soluble organosilicone polymers are used as surfactants in the reaction mix. Organosilicone polymers obtained by condensing a polyalkoxy polysilane with the monoether of a polyalkylene glycol in the presence of an acid catalyst are representative of those surfactants which can be used for this purpose. Other surfactants such as ethylene oxide modified sorbitan monopalmitate or ethylene oxide modified polypropylene ether glycol may be used, if desired, to obtain better dispersion of the components of the foam mixture.

For the purpose of facilitating an understanding of the invention, we deem it pertinent to point out that the principal reaction believed to take place, in the formation of the novel cellular polymers of this invention, is that of polymerization of the polyisocyanate component (I), via the isocyanate groups therein, to yield essentially a polyisocyanurate. However, as will be obvious to one skilled in the art, the presence in the reaction mixture of the polyepoxide (II) and the polyol (IV) can lead to other reactions other than that of polyisocyanurate formation and the resulting product will be of a complex nature, chemically speaking. It is to be understood that the above comments are given for purposes of explanation only and are not to be construed, in any way, as limiting the scope of the present invention.

The cellular polymers of this invention possess markedly superior high temperature and flame resistant properties as compared with the polymers that are presently available commercially. The cellular polymers of the invention have decomposition temperatures in excess of 500° C. as measured by thermal gravimetric analysis, and very low flame spread ratings as measured by ASTM E 84–61. It is to be noted that these high temperature resistant properties and low flame spread ratings have been achieved in the cellular polymers of the invention without recourse to the flame retardants which have hitherto been incorporated into cellular polymers to achieve flame retardant properties. The introduction of such flame retardants is highly undesirable in order to avoid reducing the structural strength and like properties of the foams. Accordingly the process and compositions of the invention represent a unique advance in foam technology. In particular the invention provides for the first time cellular polymers based on polyisocyanates which have sufficiently low flame spread ratings, as measured by the ASTM E 84–61 flame test, to permit the use of such polymers in the construction of domestic and industrial buildings.

Thus, the cellular products of the invention can be employed for all the purposes for which the currently produced cellular products are conventionally employed and are particularly suitable for applications where thermal resistance and low flame spread is required. For example, the cellular products of the invention can be employed as thermal barriers in the construction of fire walls in the building of industrial and institutional structures (e.g. schools, hospitals, etc.) and as insulating materials for high temperature pipe lines and ovens, in supersonic aircraft and also as missile components.

The following examples describe the manner and process of making and using the invention and set forth the best mode contemplated by the inventors of carrying out the invention but are not to be construed as limiting. All parts are by weight unless otherwise stated. The various data relating to thermal stability were derived as follows:

TEST A

The thermal gravimetric analysis was carried out in air, by suspending a weighed, 20–40 milligram, sample from a Cahn RG Electrobalance (Cahn Instrument Co., 15505 Minnesota Ave., Paramount, Calif.) in a small electrical wire coil furnace. The Cahn Electrobalance was connected to a Speed-O-Max W strip chart recorder (Leeds and Northup Co., Philadelphia, Pa.). The furnace temperatures were controlled by the voltage applied to the furnace heater. The furnace temperature was raised from room temperature to approximately 1000° C. in 7 minutes, and sample weight losses were automatically recorded on the strip chart.

TEST B

Foam sample weight losses were obtained by exposing weighed sample to 320° C. for 10 minutes. The results are expressed in terms of the percentage by weight, of sample observed to have been lost after the heat treatment.

The results, in each test, are expressed as the percentage, by weight, of the original sample which had been lost at each of a series of furnace temperatures.

Example 1

A high temperature resistant rigid foam was prepared in accordance with the invention using a foam metering and dispensing modulating unit equipped with a pin type impeller rotating at 5,500 r.p.m. (Admiral Equipment Corporation, Akron, Ohio) to mix three components prepared from the following ingredients and proportions:

Component A.—One hundred twenty-two parts of quasi-prepolymer prepared by reacting 22 parts (0.069 equivalent) of a 1,000 molecular weight polyether polyol having an hydroxyl equivalent weight of 320 (LG-168), Union Carbide Corp.) and 100 parts (0.700 equivalent) of modified methylenebis(phenyl isocyanate) [isocyanate equivalent 143; prepared by heating methylenebis(phenyl isocyanate) containing 94 percent 4,4'-isomer and 6 percent 2,4'-isomer with 3 percent by weight of triethylphosphate at 220° C. for 3 hours before cooling to approximately 70° C.], were admixed with 2.0 parts of a block co-polymer of dimethylpolysiloxane polyethylene oxide surfactant (SF-1109; see, Technical Data Bulletin SF-1109, General Electric Corporation) and 19.5 parts of trichlorofluoromethane (Freon 11-B, DuPont).

Component B.—A preformed mixture of 2.54 parts (0.0146 equivalent) of an epoxy novolac type resin (Epon 152, see Technical Bulletin SC:65-34, Shell Chemical Company) and 0.76 parts of modified trichlorofluoromethane.

Component C.—2.2 parts (0.013 equivalent) of a 33 percent by weight solution of 1,4-diazobicyclo[2·2·2] octane in dipropylene glycol (Dabco 33LV, see Technical Data Sheet, January 1, 1963, Houdry Process and Chemical Company, Philadelphia, Pa.).

The three components were mixed in the mixing head in the ratio of 143.5 parts of Component A, 3.3 parts of Component B and 2.2 parts of Component C. The resulting mix was dispensed at approximately 30 pounds per minute into a 14 inch x 14 inch x 14 inch cardboard box.

The mechanical properties of the resultant foam A, after curing 48 hours at room temperature were determined in accordance with the procedures set forth in the manual of "Physical Test Procedures" of the Atlas Chemical Industries, Inc. unless otherwise stated.

TABLE I

Foam A

Foam properties:
Density _____ p.c.f__ 1.85
Compressive strength (parallel to rise) __p.s.i__ 20.6
Percent Δ volume at 158° F., 100% relative humidity, after; days:
7 _____ 3.7
14 _____ 3.6
28 _____ 3.4
Percent Δ volume at 200° F., ambient relative humidity after; days:
7 _____ 2.3
14 _____ 1.6
28 _____ 1.1
ASTM D1692-59T flame test:
Maximum inches burned _____ 0.4
ASTM E 84-61 tunnel test:
Flame spread rating _____ 40
Percent weight loss at 320° C. (Test B above) after 10 minutes _____ 24.0

Example 2

Two high temperature resistant rigid foams were prepared using the procedures and equipment set forth in Example 1 and employing the reactants set forth in Table II.

The organic polyisocyanate employed in the preparation of foams B, C, and D was prepared by heating polymethylene polyphenyl isocyanate containing about 50 percent by weight of methylenebis(phenyl isocyanate), having a viscosity, at 25° C., of 250 centipoises at about 235° C. until the viscosity (at 25° C.) was 1000 centipoises.

The resultant polyisocyanate had an isocyanate equivalent of 141, and contained approximately 45 percent by weight of methylenebis(phenyl isocyanates) the remainder being triisocyanates and polyisocyanates of higher molecular weight.

The physical properties of the resultant foams, after aging 48 hours at room temperature (circa 25°-30° C.), were determined using the test procedures set forth in Example 1, unless otherwise stated.

TABLE II

| Foams | B | C | D |
|---|---|---|---|
| Ingredients: | | | |
| Component A: | | | |
| Polyisocyanate | 134 | 141 | 141 |
| Epon 152 | 9 | | |
| DER 542 [1] | | 30 | 60 |
| Freon 11-B | 14 | 19 | 28 |
| Component B: | | | |
| DMP-10 [2] | 7 | 7 | 3 |
| Tertiary amine catalyst [3] | | | 2.2 |
| Component C: | | | |
| Polyester [4] | 23 | 23 | 11.5 |
| SF-1109 | 2 | 2 | 2 |
| Freon 11-B | 9 | 9 | 4.5 |
| Foam physical properties: | | | |
| Density, p.c.f | 1.95 | 1.98 | 1.92 |
| Compressive strength, p.s.i.: | | | |
| Parallel to rise | 35.5 | 37.5 | 30.9 |
| Perpendicular to rise | 21.0 | 17.0 | 15.8 |
| Percent Δ volume at 158° F., 100% relative humidity, after: | | | |
| 7 days | 3.0 | 3.9 | 2.7 |
| 14 days | 3.9 | 4.1 | 3.0 |
| 28 days | 3.6 | 4.6 | |
| Percent Δ volume at 200° F., ambient relative humidity after: | | | |
| 7 days | 1.4 | 1.9 | 2.1 |
| 14 days | 2.1 | 2.4 | 2.2 |
| 28 days | 2.0 | 2.5 | |
| ASTM D1692-59T flame test: Maximum inches burned | 0.5 | 0.2 | |
| ASTM E 84-61 tunnel test: | | | |
| Flame spread rating | 35 | 30 | 25 |
| Percent weight loss at 320° C. (Test B above) after 10 minutes | 23.5 | 27.9 | |

[1] DER-542, the condensation product of tetrabromo bisphenol A and epichlorohydrin, percent bromine content=44-48%, epoxy equivalent weight 350 to 400, Dow Chemical Company Bulletin 170-145-3M-764.
[2] DMP-10, mixture of ortho- and para-dimethylaminomethyl phenol, Rohm and Haas Company Bulletin SP-62, February 1963.
[3] N,N',N''-tris(dimethylaminopropyl)sym-hexahydrotriazine, prepared by the method of J. Graymore, Journal Chemical Society 1493 (1931).
[4] The polyester used in this example was the product of esterifying 6 moles of chlorendic acid and 12 moles of trimethylolpropane which product is identified as Resin A as disclosed in U.S. 3,214,392 of which 75 parts by weight was blended with 25 parts by weight dipropylene glycol. Hydroxyl number of the polyol blend was 495.

Example 3

A high temperature resistant rigid foam of the invention was prepared as follows:

A mixture of 141 parts (1.00 equivalent) of the polyisocyanate prepared as described in Example 2, 10 parts (0.027 equivalent) of DER-542 and 15 parts of modified trichlorofluoromethane was prepared by mechanical blending. To this mixture was added with agitation, a preformed blend of 23 parts (0.2 equivalent) of the polyester polyol prepared as described in Example 2, two parts of SF-1109 and 10 parts of modified trichlorofluoromethane. To this blend of ingredients was added 8 parts (0.395 equivalent) of DMP-10 with mechanical agitation and the resulting mixture was rapidly poured into a cardboard box measuring 7 inches x 7 inches x 11 inches. The resultant cellular polymer E was tack free at the end of the rise and found to have the following physical properties after aging 48 hours at room temperature.

TABLE III

Foam E

Foam physical properties:
Density _____ p.c.f__ 2.42
Compressive strength (parallel to rise) __p.s.i__ 33.1
ASTM D1692-59T flame test: Maximum inches burned _____ 0.6
Thermal gravimetric analysis (Test A above): Percent weight loss at, ° C.:
200 _____ 10
300 _____ 30
400 _____ 39
500 _____ 51
600 _____ 67
700 _____ 82

Example 4

A high temperature resistant rigid foam of the invention was prepared as follows:

The polyisocyanate employed in the following procedure was prepared by heating methylenebis(phenyl isocyanate) containing 94 percent 4,4′-isomer and 6 percent 2,4′-isomer with 3 percent by weight of triethylphosphate at 220° C. for 3 hours before cooling to approximately 70° C. The resulting product had an isocyanate equivalent of 175 and contained approximately 40 percent by weight of methylenebis(phenyl isocyanate).

A mixture of 71 parts (0.405 equivalent) of said polyisocyanate, 3.0 parts of SF–1109, 3.3 parts (0.0190 equivalent) of Epon 152 and 14.5 parts of Freon 11–B were mechanically blended at about 20°–30° C. To this mixture was added 3.3 parts (0.0197 equivalent) of Dabco 33LV. This blend of ingredients was mechanically agitated at approximately 4,000 r.p.m. for approximately 5–10 seconds. The liquid foam mixture was poured into a two gallon ice cream container and allowed to rise freely at room temperature. The physical properties of the resultant foam F after curing 48 hours at room temperature, were determined using the test procedures of Example 1 and are set forth below:

TABLE IV

Foam F

Foam physical properties:
  Density _____ p.c.f__ 1.82
  Compressive strength (parallel to rise) _____ p.s.i__ 16.2
  Percent Δ volume at 158° F., 100% relative humidity after, days:
    1 _____ 0.24
    7 _____ −0.28
  Percent Δ volume at 200° F., ambient relative humidity after, days:
    1 _____ −1.0
    7 _____ −1.0

Example 5

Two high temperature resistant foams were prepared in accordance with the process of the invention employing the ingredients and proportions set forth in Table V. Mechanical properties of the resultant foams G and H were determined, after aging at least 48 hours at room temperature, using the test procedures of Example I.

TABLE V

| Foams | G | H |
|---|---|---|
| Materials: | | |
| Polyisocyanate of Example 1 | 51.3 | 73.4 |
| Pep–450 [1] | 3.6 | 5.1 |
| SF–1109 | 1.7 | 1.4 |
| Freon 11–B | 14.5 | 14.5 |
| Epon 152 | 27.8 | 3.8 |
| Dabco 33LV | 1.1 | 1.8 |
| Foam physical properties: | | |
| Density, p.c.f. | 1.95 | 1.91 |
| Compressive strength, p.s.i. (parallel to rise) | 26.6 | 33.0 |
| Percent Δ volume at 158° F, 100% relative humidity after: | | |
| 1 day | 2.4 | 2.7 |
| 7 days | 3.5 | 3.0 |
| Percent Δ volume at 200° F, ambient relative humidity after: | | |
| 1 day | 4.9 | 3.4 |
| 7 days | 7.9 | 4.2 |

[1] Pentaerythritol/propylene oxide adduct, hydroxyl number–560, see "Chemicals for Industry". Form 313, Wyandotte Chemical Corp.

Example 6

A high temperature resistant rigid foam was prepared according to the procedure of Example 2 using the reactants and proportions set forth in Table VI. The physical properties of the resulting foam I were determined, after aging 48 hours at 25° C., using the test procedures specified in Example 1.

TABLE VI

Materials: Foam I
  Component A:
    PAPI® [1] _____ 134
    Epon 152 _____ 8.25
    Freon 11–B _____ 15.35
  Component B: Dabco 33LV _____ 2.0
  Component C:
    Polyester of Example 1 _____ 23.0
    SF–1109 _____ 2.0
    Freon 11–B _____ 7.4
Foam physical properties:
  Density, p.c.f. _____ 2.03
  Compressive strength, p.s.i.:
    Parallel to rise _____ 27.3
    Perpendicular to rise _____ 21.8
  Percent Δ volume at 158° F., 100% relative humidity, after, days:
    7 _____ 3.2
    14 _____ 4.0
    28 _____ 4.0
  Percent Δ volume at 200° F., ambient relative humidity, after, days:
    7 _____ 1.3
    14 _____ 1.9
ASTM D1692–59T flame test: Maximum inches burned _____ 0.5
ASTM E 84–61 tunnel test:
  Flame spread rating _____ 35
  Percent weight loss at 320° C. (Test B above) after 10 minutes _____ 26.6

[1] Polymethylene polyphenol isocyanate; isocyanate equivalent 133; see PAPI® product report, the Upjohn Company, Polymer Chemical Division, Kalamazoo, Mich.

Example 7

Employing the procedure of Example 3, two high temperature resistant rigid foams were prepared using the ingredients and proportions set forth in Table VII. Physical properties of the resultant foams J and K were determined, after curing 48 hours at room temperature (20°–30° C.), using the test procedures of Example 1.

TABLE VII

| Foams | J | K |
|---|---|---|
| Materials: | | |
| Quasi-Prepolymer [1] | 256 | 256 |
| Y–4915 | 6.2 | 6.2 |
| Freon 11–B | 43.0 | 43.0 |
| Epon 152 | 7.0 | 7.0 |
| Tertiary amine catalyst [2] | 2.31 | 6.8 |
| Foam physical properties: | | |
| Density, p.c.f. | 2.16 | 2.07 |
| Compressive strength, p.s.i. (parallel to rise) | 33.0 | 32.5 |
| Percent Δ volume at 158° F., 100% relative humidity after: | | |
| 1 day | 3.4 | 9.5 |
| 3 days | 5.0 | 13.8 |
| 7 days | 5.1 | 15.4 |
| 14 days | 6.5 | 14.6 |
| Percent Δ volume at 200° F., ambient relative humidity after: | | |
| 3 days | 4.3 | 6.3 |
| 7 days | 4.0 | 6.0 |

[1] 150 parts of the polyisocyanate of Example 1 and 32 parts of LG–168 were blended and allowed to stand overnight at room temperature; the I. E. of the resultant quasi-prepolymer was 191.
[2] N,N′,N″-tris(dimethylaminopropyl)sym-hexahydrotriazine, prepared by the method of J. Graymore, Journal Chemical Society 1493 (1931).

Example 8

A low density, high temperature resistant rigid foam was prepared employing the procedures and test methods of Example 3, using the ingredients and proportions of Table VIII.

TABLE VIII

Materials: Foam L
  Polyisocyanate of Example 1 _____ 63.8
  SF–1109 _____ 2.7
  Freon 11–B _____ 14.5
  Dabco 33LV _____ 2.1
  Epon 152 _____ 4.0
  T–701 [1] _____ 12.9

See footnote at end of table.

TABLE VIII—Continued

Foam physical properties:
    Density, p.c.f. ------------------------------- 1.87
    Compressive strength, p.s.i. (parallel to rise)-- 20.3
    Percent Δ volume at 158° F., 100% relative humidity after, days:
        1 ---------------------------------------- 2.1
        7 ---------------------------------------- 4.3
    Percent Δ volume at 200° F., ambient relative humidity after, days:
        1 ---------------------------------------- 3.4
        7 ---------------------------------------- 2.7

[1] Ethylenediamine/polyalkylene oxide polyether tetrol, hydroxyl number 62, see "Chemicals for Industry," Wyandotte Chemical Corporation.

Example 9

Employing the procedure of Example 3, a high temperature resistant rigid foam was prepared using the ingredients and proportions of Table IX. Physical properties of the resultant foam M were determined, after curing 48 hours at room temperature, using the test procedures described in Example 1.

TABLE IX

Materials:                                             Foam M
    Polyisocyanate of Example 1 ----------------- 71.7
    SF-1109 ------------------------------------- 2.7
    Freon 11-B ----------------------------------- 14.5
    Dabco 33LV ---------------------------------- 2.2
    Epon 152 ------------------------------------- 2.2
    Dipropylene glycol --------------------------- 6.7
Foam physical properties:
    Density, p.c.f. ------------------------------- 2.22
    Compressive strength, p.s.i. (parallel to rise) -- 33.8
    Percent Δ volume at 158° F., 100% relative humidity after, days:
        1 ---------------------------------------- 3.9
        7 ---------------------------------------- 5.7
    Percent Δ volume at 200° F., ambient relative humidity after, days:
        1 ---------------------------------------- 2.6
        7 ---------------------------------------- 2.9

Example 10

A series of high temperature resistant foams of the invention were prepared following the procedure of Example 3 employing the reactants and proportions set forth in Table X. The resultant foams N, O, and P were found to have the following properties:

TABLE X

| Foams | N | O | P |
|---|---|---|---|
| Ingredients: | | | |
| Polyisocyanate of Example 1 | 143 | 143 | 143 |
| Epon 152 | 3.2 | 1.6 | 0.8 |
| LG-168 | 33 | 33 | 33 |
| SF-1109 | 2 | 2 | 2 |
| Freon 11-B | 27 | 27 | 27 |
| Dabco 33LV | 3.1 | 3.1 | 3.1 |
| Foam physical properties: Density, p.c.f. | 1.89 | 1.99 | 2.13 |
| Thermal gravimetric analysis (Test A above), percent weight loss at: | | | |
| 100° C | 5 | 3 | 2 |
| 300° C | 9 | 6 | 6 |
| 400° C | 17 | 18 | 16 |
| 500° C | 29 | 29 | 27 |
| 600° C | 39 | 39 | 37 |
| 700° C | 48 | 46 | 52 |

Example 11

A series of high temperature resistant foams were prepared employing various polyepoxides in accordance with the process of the invention. The procedure followed was that of Example 3 using the ingredients and proportions set forth in Table XI. The resultant foams Q, R, S, and T were found to have the following properties after aging 48 hours at room temperature.

TABLE XI

| Foams | Q | R | S | T |
|---|---|---|---|---|
| Ingredients: | | | | |
| Polyisocyanate of Example 2 | 141 | 141 | 141 | 141 |
| Freon 11-B | 29 | 27 | 27 | 27 |
| Polyol of Example 2 | 23 | 23 | 23 | 23 |
| DER-542 | 30 | | | |
| DER-332 [1] | | 14 | | |
| Epon 152 | | | 14 | |
| Unox-206 [2] | | | | 11.3 |
| SF-1109 | 2 | 2 | 2 | 2 |
| DMP-10 | 8 | 8 | 8 | 8 |
| Foam physical properties: | | | | |
| Density, p.c.f. | 2.29 | 1.96 | 2.01 | 2.15 |
| Compressive, p.s.i. (parallel to rise) | 26.8 | 31.4 | 23.7 | 33.5 |
| ASTM D1692—59T flame test: Maximum inches burned | 0.5 | 0.3 | 0.6 | 0.7 |
| Thermal gravimetric analysis (Test A above): | | | | |
| Percent weight loss at: | | | | |
| 200° C | 8.5 | 2 | 6 | 6 |
| 300° C | 34 | 17 | 25 | 20 |
| 400° C | 45 | 33 | 38 | 34 |
| 500° C | 58 | 42 | 48 | 42 |
| 600° C | 73 | 53 | 57 | 51 |
| 700° C | 85 | 68 | 77 | 66 |
| Percent weight loss at 320° C. (Test B above) after 10 minutes | 21.8 | 20.0 | 19.7 | 17.7 |

[1] Reaction product of bisphenol A and epichlorohydrin, average epoxy equivalent weight 175, Dow Chemical Company Technical Bulletin 170-141-A.
[2] Vinyl cyclohexene dioxide, Union Carbide Corporation Technical Bulletin F-6136U (1967).

Example 12

Following the procedure and test methods of Example 3 a series of high temperature resistant foams of the invention were prepared employing the ingredients and proportions set forth in Table XII. The resultant foams U, V, W, and X, after curing 48 hours at room temperature, were found to have the following physical properties.

TABLE XII

| Foams | U | V | W | X |
|---|---|---|---|---|
| Ingredients: | | | | |
| Polyisocyanate of Example 2 | 141 | 141 | 141 | 141 |
| Freon 11-B | 29 | 27 | 27 | 27 |
| PG-435DM [1] | 25.8 | 25.8 | 25.8 | 25.8 |
| DER-542 | 30 | | | |
| DER-332 | | 14 | | |
| Epon 152 | | | 14 | |
| Unox 206 | | | | 11.3 |
| SF-1109 | 2 | 2 | 2 | 2 |
| DMP-10 | 9 | 9 | 9 | 9 |
| Foam physical properties: | | | | |
| Density, p.c.f. | 2.36 | 2.12 | 2.09 | 2.29 |
| Compressive strength, p.s.i. (parallel to rise) | 34.0 | 29.2 | 32.2 | 30.1 |
| ASTM D1692—59T flame test: Maximum inches burned | 0.5 | 0.3 | 0.7 | 0.8 |
| Thermal Gravimetric analysis (Test A above): | | | | |
| Percent weight loss at: | | | | |
| 200° C | 8 | 5 | 3 | 6 |
| 300° C | 28 | 19 | 16 | 20 |
| 400° C | 39 | 33 | 31 | 34 |
| 500° C | 47 | 43 | 41 | 43 |
| 600° C | 58 | 50 | 52 | 51 |
| 700° C | 75 | 63 | 64 | 73 |
| Percent weight loss at 320° C. (Test B above) after 10 minutes | 27.1 | 21.3 | 18.6 | 18.8 |

[1] Methyl glucoside based polyoxypropylene polyether, hydroxyl equivalent weight 129, Olin Mathieson Bulletin 82-2-2.

Example 13

Following the procedure of preparation and the test methods of Example 3 two high temperature resistant foams of the invention were prepared employing the ingredients and proportions set forth in Table XIII. The resultant foams Y and Z, after curing 48 hours at room temperature, were found to have the following properties.

TABLE XIII

| Foams | Y | Z |
| --- | --- | --- |
| Ingredients: | | |
| Quasi-prepolymer of Example 7 | 230 | 230 |
| Y-4915 [1] | 6.9 | 6.9 |
| Freon 11-B | 39.6 | 40.4 |
| DMP-30 | 23 | |
| DMP-10 | | 28.7 |
| Foam physical properties: | | |
| Density, p.c.f. | 2.20 | 2.12 |
| Compressive strength, p.s.i. (parallel to rise) | 28.2 | 33.3 |
| Percent Δ volume at 158° F., 100% relative humidity after: | | |
| 24 hours | 9.4 | 12.6 |
| 3 days | 12.2 | 17.5 |
| 7 days | 13.2 | 19.5 |
| Percent Δ volume at 200° F., ambient relative humidity after: | | |
| 3 days | 9.8 | 9.0 |
| 7 days | 10.3 | 9.8 |

[1] See Laboratory data sheet "Y-4915 Silicone Surfactant for Rigid Urethane Foam," October 5, 1965, Union Carbide Corporation.

We claim:
1. A cellular polymer in which the major recurring polymer unit is isocyanaurate which polymer comprises the reaction product obtained by bringing together, in the presence of a blowing agent
   (a) a polyisocyanate containing from about 35 percent to about 85 percent by weight of methylenebis(phenyl isocyanate);
   (b) from about 0.01 to about 0.25 equivalent, per equivalent of said polyisocyanate, of a tertiary amine trimerization catalyst; and
   (c) from about 0.01 to about 0.3 equivalent, per equivalent of said polyisocyanate, of a polyester polyol derived from a polyhydric alcohol and chlorendic acid.
2. The polymer foam of claim 1 wherein the polyisocyanate is methylenebis(phenyl isocyanate) which has been heated at 160° C. to 250° C. in the presence of about 0.1 percent to about 3 percent of a trialkyl phosphate until the isocyanate equivalent is within the range of about 130 to about 150.
3. The polymer foam of claim 1 wherein the polyisocyanate is polymethylene polyphenyl isocyanate containing about 50 percent by weight of methylenebis(phenyl isocyanate) which has been heated at a temperature within the range of about 150° C. to about 300° C. until the viscosity, at 25° C., has increased to about 1000 centipoises.
4. The polymer foam of claim 1 wherein the tertiary amine is selected from the class consisting of triethylene diamine, a N,N',N''-trialkylaminoalkylhexahydrotriazine, a mono-(dialkylaminoalkyl)phenol, a 2,4,6-tri(dialkylaminoalkyl)phenol and mixtures thereof.
5. A cellular polymer in which the major recurring polymer unit is isocyanurate which polymer comprises the reaction product obtained by bringing together, in the presence of a blowing agent
   (a) a polyisocyanate containing from about 35 percent to about 85 percent by weight of methylenebis-(phenyl isocyanate);
   (b) from about 0.01 to about 0.25 equivalents, per equivalent of said polyisocyanate, of a tertiary amine trimerization catalyst;
   (c) a polyepoxide having at least two epoxy groups selected from the class consisting of epoxy groups present in a substituent attached to a cyclic hydrocarbon compound and epoxy groups fused to a non-aromatic ring in a cyclic hydrocarbon compound, said polyepoxide being present in an amount such that there are from about 0.0045 to about 0.2 epoxy groups for each isocyanate group present in the reaction mixture; and
   (d) from about 0.09 to about 0.2 equivalent, per equivalent of said polyisocyanate, of a polyester polyol derived from a polyhydric alcohol and chlorendic acid.

6. The polymer foam of claim 5, wherein said polyisocyanate is methylenebis(phenyl isocyanate) which has been heated at 160° C. to 250° C. in the presence of about 0.1 percent to about 3 percent of a trialkyl phosphate until the isocyanate equivalent is within the range of about 130 to about 150.
7. The polymer foam of claim 5, wherein the polyisocyanate is polymethylene polyphenyl isocyanate containing about 50 percent by weight of methylenebis(phenyl isocyanate) which has been heated at a temperature within the range of about 150° C. to about 300° C. until the viscosity, at 25° C., has increased to about 1000 centipoises.
8. The polymer of claim 5 wherein the tertiary amine is selected from the class consisting of triethylene diamine, an N,N',N''-trialkylaminoalkylhexahydrotriazine, a mono-(dialkylaminoalkyl)phenol, a 2,4,6-tri(dialkylaminoalkyl)phenol and mixtures thereof.
9. The polymer foam of claim 5 wherein the polyepoxide compound is a polyglycidyl ether of a phenolic compound selected from the class consisting of a polyhydric mononuclear phenol, a polyhydric fused ring phenol, and a non-fused polynuclear polyhydric phenol having the formula:

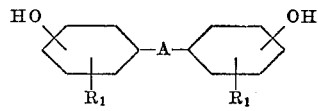

wherein $R_1$ represents from 0 to 4 substituents selected from the class consisting of halogen and lower-alkyl, A is a bridging group selected from the class consisting of

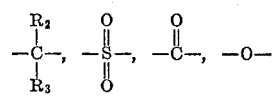

and a single covalent bond wherein $R_2$ and $R_3$ each represent a moiety selected from the class consisting of hydrogen, lower-alkyl, lower-cycloalkyl and aryl.
10. The polymer foam of claim 5 wherein the polyepoxide is a diglycidyl ether of a halogenated non-fused polynuclear polyhydric phenol having the formula:

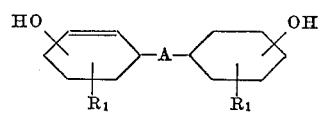

wherein each $R_1$ represents from 1 to 4 halogen substituents, A is a bridging group selected from the class consisting of

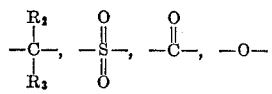

and a single covalent bond, wherein $R_2$ and $R_3$ each represent a moiety selected from the class consisting of hydrogen, lower-alkyl, lower-cycloalkyl and aryl.
11. A cellular polymer in which the major recurring polymer unit is isocyanurate, which polymer comprises the reaction product obtained by bringing together, in the presence of a blowing agent,
   (a) a polymethylene polyphenyl isocyanate containing about 50 percent by weight of methylenebis(phenyl isocyanate);
   (b) from 0.02 to 0.05 equivalent per equivalent of said polyisocyanate of a tertiary amine trimerization catalyst selected from the class consisting of triethylenediamine, an N,N',N'' - trialkylaminoalkylhexa hydrotriazine, a monodialkylaminoalkyl)phenol, a 2,4,6-tris(dialkylaminoalkyl)phenol, and mixtures thereof;
   (c) an amount corresponding to from about 0.0045 to about 0.2 (equivalent) epoxy groups per equivalent of said polyisocyanate of a diglycidyl ether of a halogenated non-fused polynuclear polyhydric phenol having the formula:

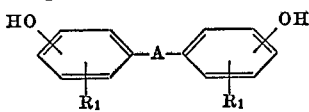

wherein each $R_1$ represents from 1 to 4 halogen substituents, A is a bridging group selected from the class consisting of

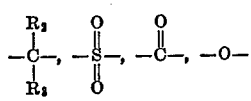

and a single covalent bond, wherein $R_2$ and $R_3$ each represent a moiety selected from the class consisting of hydrogen, lower-alkyl, lower-cycloalkyl, and aryl;

(d) from about 0.09 to about 0.2 equivalent per equivalent of said polyisocyanate of a polyester polyol comprising the product of reaction of chlorendic acid and a polyhydric alcohol.

References Cited

UNITED STATES PATENTS

| 3,516,950 | 6/1970 | Haggis | 260—859 R |
| 3,036,999 | 5/1962 | Worsley et al. | 260—75 N P |
| 3,211,704 | 10/1965 | Gilman et al. | 260—77.5 N C |
| 2,643,244 | 6/1953 | Simons | 260—49 |
| 2,788,335 | 4/1957 | Barthel | 260—2.5 |
| 2,830,038 | 4/1958 | Pattison | 260—77.5 |
| 2,906,717 | 9/1959 | Sekmakas | 260—2.5 |
| 3,025,160 | 3/1962 | Bunge et al. | 96—1 |
| 3,179,626 | 4/1965 | Beitchman | 260—77.5 |
| 3,198,851 | 8/1965 | Hoy | 260—836 |
| 3,206,352 | 9/1965 | Gollis et al. | 161—93 |
| 3,211,703 | 10/1965 | Gilman et al. | 260—77.5 |
| 3,242,108 | 3/1966 | McGary et al. | 260—2.5 |

FOREIGN PATENTS

| 908,337 | 10/1962 | Great Britain | 260—2.5 A |
| 874,430 | 8/1961 | Great Britain | 260—2.5 |
| 1,004,924 | 9/1965 | Great Britain | 260—2.5 |
| 1,441,565 | 5/1966 | France | 260—2.5 |
| 1,478,759 | 3/1967 | France | 260—2.5 |

OTHER REFERENCES

Carwin, "Papi—Polymethylene Polyphenylisocyanate," data sheet of The Carwin Co. (now the Upjohn Co.), published in December 1961.

Dutch patent publication number 6705694 published Oct. 23, 1967.

DONALD E. CZAJA, Primary Examiner

M. J. WELSH, Assistant Examiner

U.S. Cl. X.R.

260—47 CB, 63 R, 77.5 NC